United States Patent
Lee et al.

(10) Patent No.: US 8,259,305 B2
(45) Date of Patent: Sep. 4, 2012

(54) SURFACE SHAPE MEASURING SYSTEM AND SURFACE SHAPE MEASURING METHOD USING THE SAME

(75) Inventors: Sang-yun Lee, Daejeon (KR); MinGu Kang, Daejeon (KR); Ssang-gun Lim, Daejeon (KR)

(73) Assignee: Intekplus Co., Ltd., Daejeon (KR)

( * ) Notice: Subject to any disclaimer, the term of this patent is extended or adjusted under 35 U.S.C. 154(b) by 302 days.

(21) Appl. No.: 12/747,763

(22) PCT Filed: Dec. 10, 2008

(86) PCT No.: PCT/KR2008/007314
§ 371 (c)(1),
(2), (4) Date: Jun. 11, 2010

(87) PCT Pub. No.: WO2009/078617
PCT Pub. Date: Jun. 25, 2009

(65) Prior Publication Data
US 2010/0259765 A1    Oct. 14, 2010

(30) Foreign Application Priority Data
Dec. 14, 2007   (KR) .................. 10-2007-0131395

(51) Int. Cl.
*G01B 11/02* (2006.01)
(52) U.S. Cl. ................ 356/511; 356/479; 356/497
(58) Field of Classification Search .............. 356/479, 356/497, 511
See application file for complete search history.

(56) References Cited

U.S. PATENT DOCUMENTS
5,777,740 A * 7/1998 Lacey et al. ............ 356/495
7,158,234 B2 * 1/2007 Uchiyama et al. ...... 356/479
2001/0043336 A1  11/2001 Shitamich

FOREIGN PATENT DOCUMENTS
JP  10-009825   1/1998
KR  10-0672818  1/2007

OTHER PUBLICATIONS
International Search Report—PCT/KR2008/007314 dated Jun. 29, 2009.

* cited by examiner

*Primary Examiner* — Tarifur Chowdhury
*Assistant Examiner* — Jonathon Cook
(74) *Attorney, Agent, or Firm* — Kile Park Goekjian Reed & McManus PLLC

(57) ABSTRACT

The surface shape measuring system includes an illumination unit including a main light source, a focusing lens, and a projection lens; a beam splitter to split illumination light emitted respectively irradiated onto a reference surface and a measurement surface; a light detecting element to capture an interference pattern; and a control computer to obtain surface shape data through white-light interference pattern analysis from an image captured and detect whether or not the measurement surface is defective from the obtained data, wherein a subsidiary light source to provide falling illumination to the target object; and two-dimensional data and three-dimensional data regarding the surface shape of the target object are obtained by selectively intermitting the turning-on of the main light source and the subsidiary light source and the irradiation of the illumination light onto the reference surface.

10 Claims, 7 Drawing Sheets

SURFACE SHAPE MEASURING SYSTEM AND SURFACE SHAPE MEASURING METHOD USING THE SAME

TECHNICAL FIELD

The present invention relates to a surface shape measuring system and a surface shape measuring method using the same, and more particularly to a surface shape measuring system, in which both two-dimensional data and three-dimensional data of a target object to be measured are obtained using a single apparatus using white-light scanning interferometry and three-dimensional inspection is performed only for specific regions of the target object rather than the overall dimensions of the target object, and a surface shape measuring method using the same.

BACKGROUND ART

Recently, in order to inspect the processed and manufactured state of a fine structure having a complicated stepped structure due to miniaturization and refinement of electronic and mechanical parts, a high measurement accuracy to size, shape, and surface roughness has been required.

Therefore, a size measuring method using an optical two-dimensional measuring apparatus and a shape or a thickness (surface roughness) measuring method using an optical three-dimensional measuring apparatus are used now in measurement of small-sized electronic and mechanical parts.

As one of conventional optical three-dimensional measuring apparatuses, white-light scanning interferometry (WSI) has been proposed.

With reference to FIG. 7, the WSI uses a principle, in which when a reference beam and an object beam obtained by splitting light generated from a light source 100 by a beam splitter 200 are respectively reflected by a reference surface of a reference minor 400 and a measurement surface (P) of a target object 300 to be measured, and generate an interference signal, a light detecting element 500 captures the interference signal and then analyzes the signal. That is, the WSI measures a three-dimensional shape by detecting a position using a characteristic, in which the interference signal is generated only when the reference beam and the object beam pass through the same optical path.

When interference signals at respective measurement points within a measurement region are observed using the above principle while moving the object at minute intervals in the optical axial direction with a transfer unit, such as a PZT actuator, a short interference signal is generated at a position of each of the points, where the measurement beam has the same optical path as that of the reference beam.

Therefore, when the interference signal generating positions of all the measurement points within the measurement region are calculated, data regarding the three-dimensional shape of the measurement surface are obtained, and thickness and shape of a thin film layer are measured from the obtained three-dimensional shape data.

A measuring apparatus using white-light scanning interferometry is used in the measurement of the film thickness of a dielectric multi-layered film or the analysis of the structure of a continuum (diffuser), for example, the eye ground or the skin, as well as in the measurement of the three-dimensional shape of a fine structure.

However, with the conventional measuring apparatuses, the two-dimensional measuring apparatus to measure the size of a target object to be measured and the three-dimensional measuring apparatus to measure the shape and thickness (surface roughness) of the object are independently designed and separately used, and thus are alternately used to measure the two-dimensional size and the three-dimensional shape of the object, thereby causing troublesomeness.

Further, in case that the conventional three-dimensional measuring apparatus is used, the three-dimensional measuring apparatus obtains an interference pattern by scanning the overall dimensions of a target object to be measured and detects whether or not the object is defective using the interference pattern, and thus has a low inspection speed.

DISCLOSURE OF INVENTION

Technical Problem

Therefore, the present invention has been made in view of the above problems, and it is an object of the present invention to provide a surface shape measuring system using white-light scanning interferometry, in which two-dimensional data through the size measurement and surface defect inspection of a target object to be measured are obtained and three-dimensional data regarding the shape and thickness of the target object are obtained using a single apparatus, and a surface shape measuring method using the same.

It is another object of the present invention to provide a surface shape measuring system using white-light scanning interferometry, in which two-dimensional data of a target object to be measured are obtained by selectively irradiating coaxial illumination and coaxial/falling illumination using a single apparatus, three-dimensional inspection regions of the target object are abstracted from the obtained two-dimensional data, and three-dimensional measurement is selectively performed only for the abstracted inspection regions, so as to simplify the apparatus and increase an inspection speed, and a surface shape measuring method using the same.

Technical Solution

In accordance with an aspect of the present invention, the above and other objects can be accomplished by the provision of a surface shape measuring system, including an illumination unit including a main light source, a focusing lens, and a projection lens; a beam splitter to split illumination light emitted from the illumination unit into beams respectively irradiated onto a reference surface of a reference minor and a measurement surface of a target object to be measured; a light detecting element to capture an interference pattern generated by the interference of a reference beam and an object beam respectively reflected by the reference surface and the measurement surface; and a control computer to obtain surface shape data through white-light interference pattern analysis from an image captured by the light detecting element and detect whether or not the measurement surface is defective from the obtained data, wherein a subsidiary light source to provide falling illumination to the target object is provided between the target object and the beam splitter; and two-dimensional data and three-dimensional data regarding the surface shape of the target object are obtained by selectively intermitting the turning-on of the main light source and the subsidiary light source and the irradiation of the illumination light onto the reference surface.

In accordance with another aspect of the present invention, there is provided a surface shape measuring method, in which illumination light emitted from a main light source is split into beams, respectively irradiated onto a reference surface of a reference mirror and a measurement surface of a target object to be measured, by a beam splitter, and the surface shape of the target object is measured through an interference pattern generated by the interference of a reference beam and an object beam respectively reflected by the reference surface and the measurement surface, including obtaining two-dimensional data of the target object by cutting off the supply of the illumination light onto the reference surface and selectively intermitting the turning-on of the main light source and a subsidiary light source provided between the beam splitter and the target object; abstracting three-dimensional inspection regions from the obtained two-dimensional data; and obtaining three-dimensional data of the target object by generating an interference pattern for each of the abstracted inspection regions and capturing the interference pattern.

BRIEF DESCRIPTION OF DRAWINGS

The above and other objects, features and other advantages of the present invention will be more clearly understood from the following detailed description taken in conjunction with the accompanying drawings, in which.

BEST MODE FOR CARRYING OUT THE INVENTION

Now, preferred embodiments of the present invention will be described in detail with reference to the annexed drawings.

Figure 1:
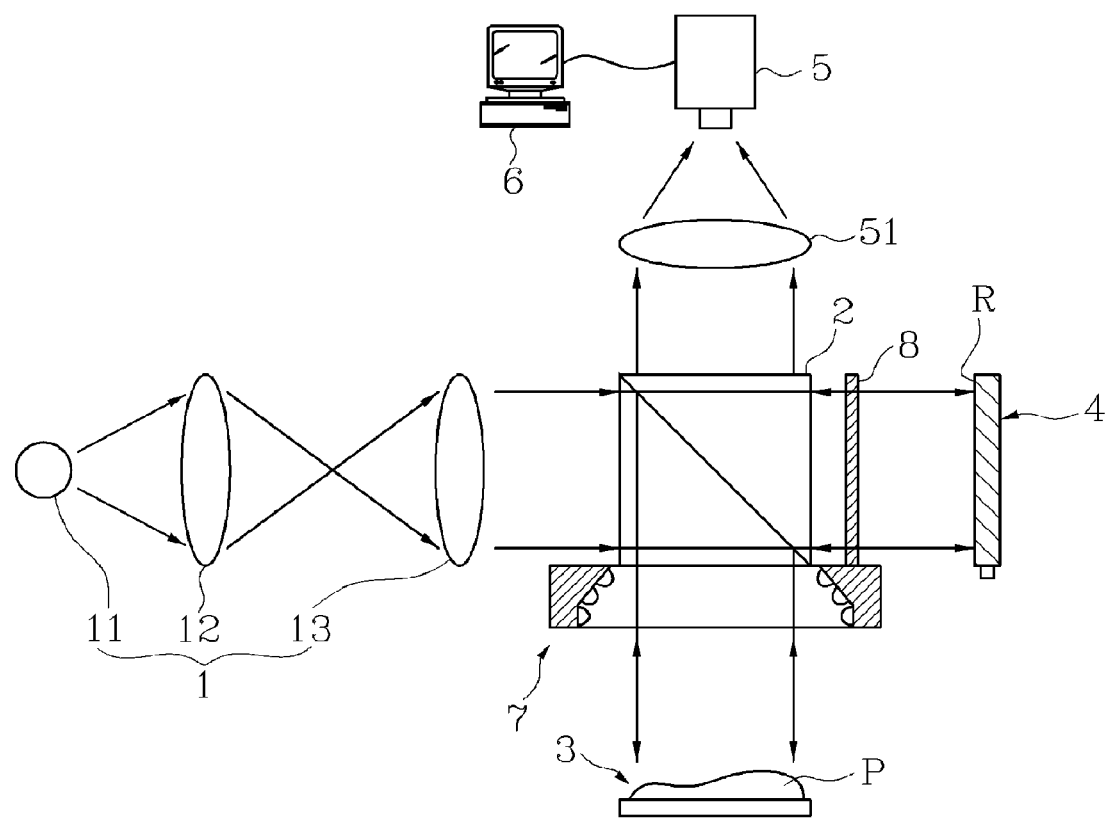
FIG. 1 is a schematic view of a surface shape measuring system in accordance with the present invention

FIG. 1 is a schematic view of a surface shape measuring system in accordance with the present invention.

With reference to FIG. 1, the surface shape measuring system of the present invention includes an illumination unit 1, a beam splitter 2, a light detecting element 5, and a subsidiary light source 7.

The illumination unit 1 includes a main light source 11, a focusing lens 12 to focus light from the main light source 11, and a projection lens 13 to project the focused light from the focusing lens 12 to the beam splitter 2.

Figure 2:
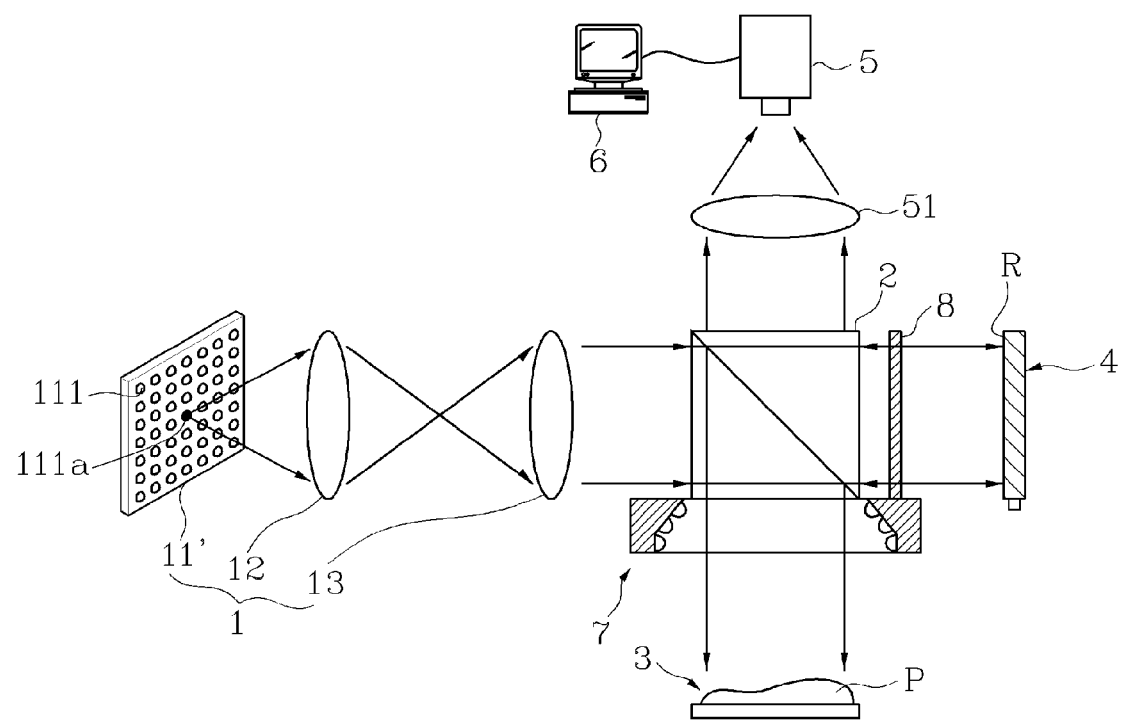
FIGS. 2 to 4 are schematic views illustrating modified embodiments of an illumination unit of the system of FIG. 1.

FIG. 2 is a schematic view illustrating another embodiment of the illumination unit 1 of FIG. 1. Here, the illumination unit 1 includes a main light source 11 including an illumination panel 11 and a plurality of light emitting diodes 111 arranged in a matrix shape on the illumination panel 11'.

The light emitting diodes 111 are divided into groups according to layers in the outward direction from the central light emitting diode 111a, and the turning-on of the light emitting diodes 111 is controlled according to the groups.

Further, the central light emitting diode 111a has a brightness value, which is higher than that of other peripheral light emitting diodes 111.

That is, two-dimensional inspection requires coaxial illumination having an area larger than that of an inspection region, and thus in the two-dimensional inspection, all the light emitting diodes 111 are turned on, or the plural layers of the light emitting diodes 111 are turned on.

Further, in three-dimensional inspection, in order to supply illumination near to a point light source, which favorably generates an interference pattern, only the light emitting diode 111a is preferably turned on.

Figure 3:
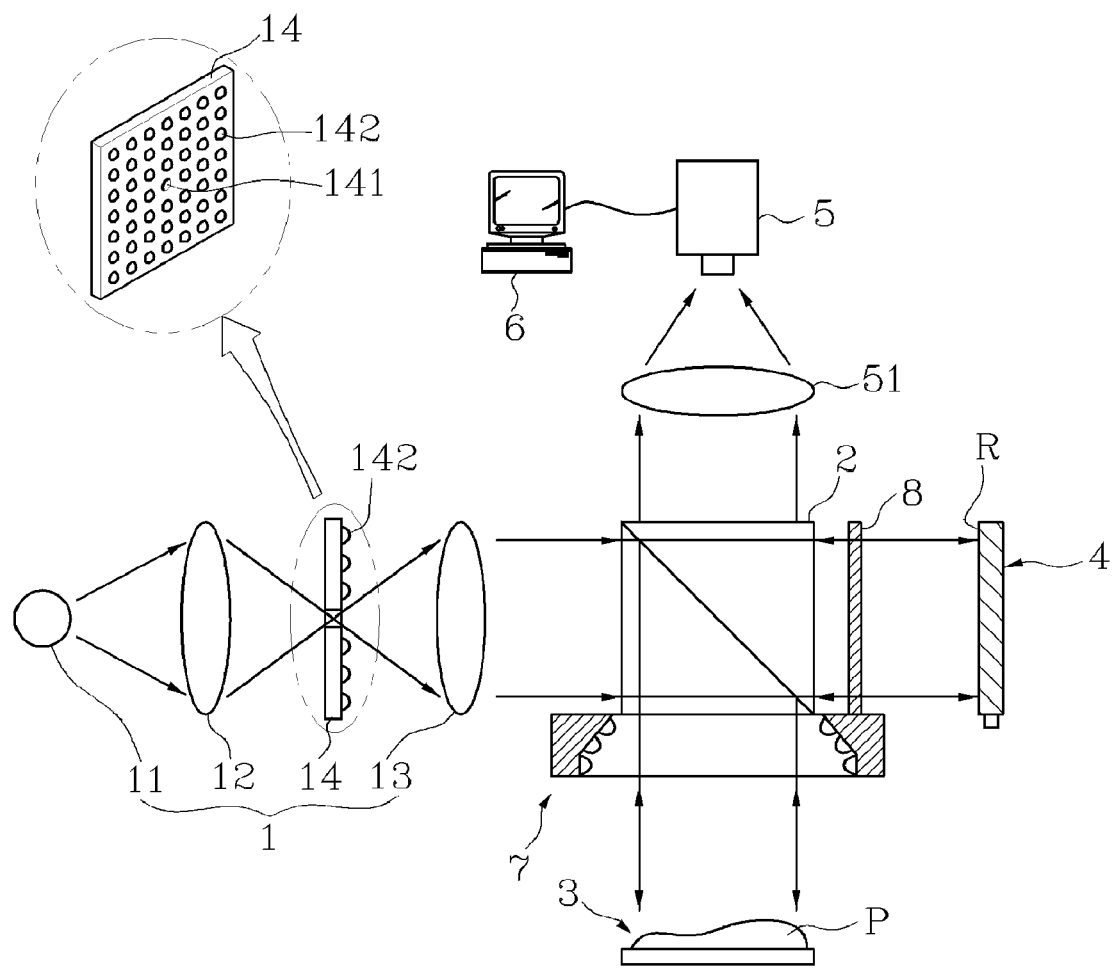

FIG. 3 is a schematic view illustrating a further embodiment of the illumination unit 1 of FIG. 1. Here, the illumination unit 1 includes a main light source 11, a focusing lens 12, a projection lens 13, and an illumination panel 14.

A plurality of light emitting diodes 142 arranged in a matrix shape is provided on the illumination panel 14, and a pin hole 141 is formed through the center of the illumination panel 14.

In the above configuration, two-dimensional inspection requires coaxial illumination having an area larger than that of an inspection region, and thus in the two-dimensional inspection, the main light source 11 and all the light emitting diodes 142 of the illumination panel 14 are turned on, or the plural layers of the light emitting diodes 142 are selectively turned on.

Further, in three-dimensional inspection, in order to supply illumination near to a point light source, which favorably generates an interference pattern, only the main light source 11 is preferably turned on.

Figure 4:
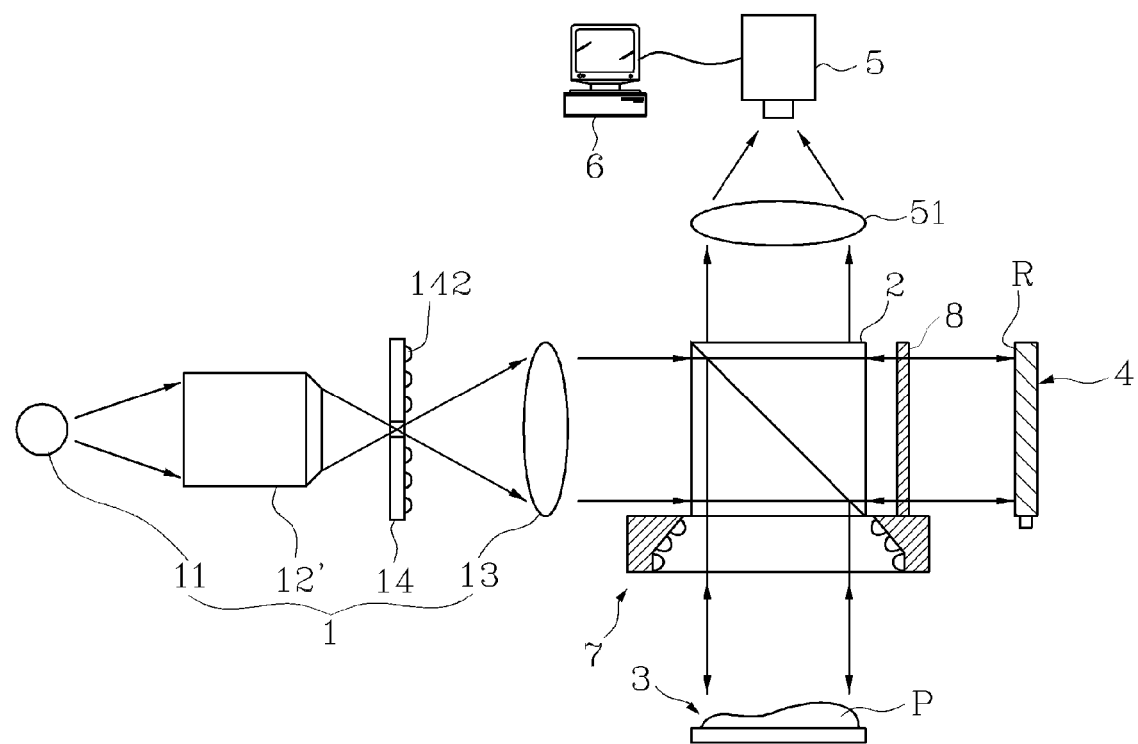

FIG. 4 is a schematic view illustrating a still further embodiment of the illumination unit 1 of FIG. 1. Here, the illumination unit 1 includes a main light source 11, a microscope objective lens 12, and an illumination panel 14.

A plurality of light emitting diodes 142 arranged in a matrix shape is provided on the illumination panel 14, and a pin hole 141 is formed through the center of the illumination panel 14.

In two-dimensional inspection, the main light source 11 and all the light emitting diodes 142 of the illumination panel 14 are turned on, and thus irradiate illumination light having an area larger than that of an inspection region onto the region.

Further, in three-dimensional inspection, only the main light source 11 is preferably turned on such that light emitted from the main light source 11 passes through the microscope objective lens 12' thus increasing the visibility of an interference pattern while maintaining resolution.

That is, when a light source emits light having a narrow wavelength or is near to a point light source, such as a laser source, an interference pattern is favorably generated, and when the light source emits light having a high wavelength, resolution is lowered. Thus, the microscope objective lens 12' which effectively focuses light on one point, is preferably used.

The beam splitter 2 splits illumination light emitted from the illumination unit 1 into beams respectively irradiated onto a reference surface (R) and a surface (R) of a target object to be measured, and the light detecting element 5 captures an image with an interference pattern.

That is, the light detecting element 5 captures the image with the interference pattern obtained by the interference of a reference beam and an object beam, which are respectively reflected by the reference surface (R) and the surface (R) of the object, and includes a projection lens 13.

Further, a control computer 6 obtains surface shape data through the analysis of the white-light interference pattern from the image captured by the light detecting element 5, and detects whether or not the object 3 is defective through the analysis of the obtained data.

The subsidiary light source 7 is provided between the object 3 and the beam splitter 2, and provides falling illumination to the object 3.

Figure 5:
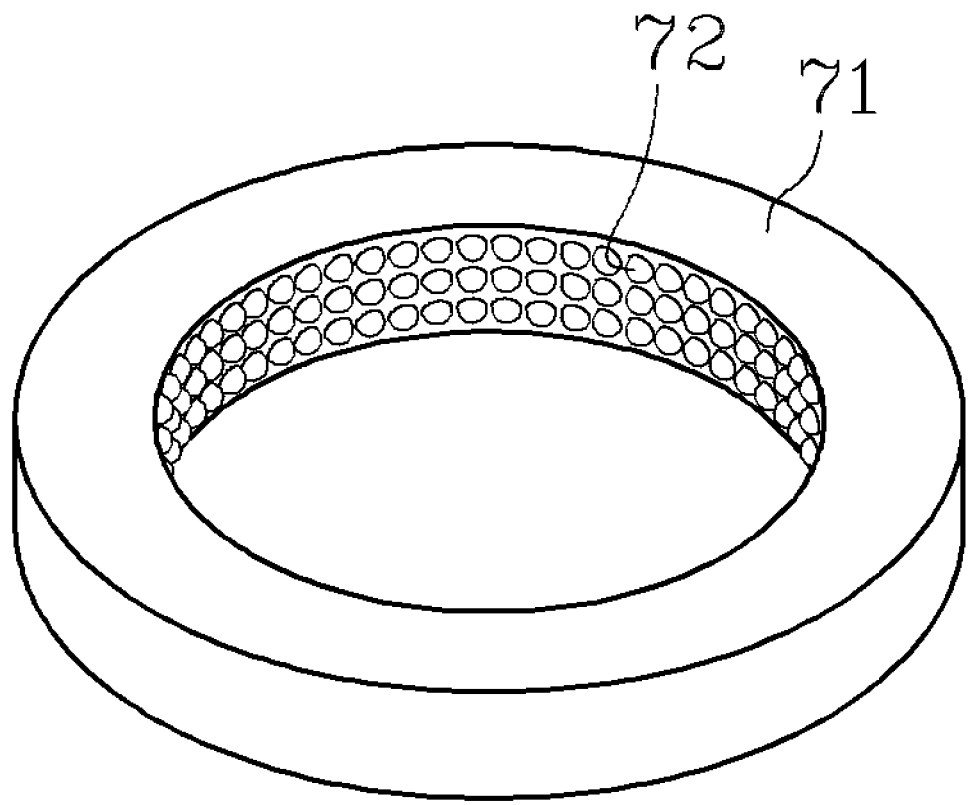
FIG. 5 is a perspective view illustrating an embodiment of a subsidiary light source of the system of FIG. 1.

The subsidiary light source 7, as shown in FIG. 5, includes a ring-shaped body 71, and a plurality of light emitting diodes 72 provided along the inner circumferential surface of the ring-shaped body 71.

Preferably, a mechanical shutter 8 to selectively intermit the irradiation of light onto the reference surface (R) is further provided between the beam splitter 2 and a reference mirror 4.

The above surface shape measuring system obtains size data from an image captured after the irradiation of coaxial illumination through the turning-on of the main light source 11, and obtains surface defect data from an image captured after the irradiation of coaxial/falling illumination through the turning-on of the main light source 11 and the subsidiary light source 7, thus obtaining two-dimensional data regarding size and surface defect.

Further, three-dimensional inspection regions of the object are abstracted using the obtained two-dimensional data, and three-dimensional measurement only for the abstracted three-dimensional inspection regions is performed.

That is, three-dimensional data are obtained by generating an interference pattern through the formation of a reference beam and an object beam only for the abstracted three-dimensional inspection regions and capturing the interference pattern.

Hereinafter, a surface shape measuring method using the surface shape measuring system of the present invention will be described.

First, two-dimensional data of a target object to be measured are obtained by selectively intermitting the turning-on of the main light source 11 and the subsidiary light source 7.

That is, only coaxial illumination is irradiated onto the surface (P) of the target object 3 by turning on the main light source 11, a first image is obtained by capturing the image of the surface (P) of the target object 3 using the light detecting element 5, and then a size of the target object is measured by analyzing the captured first image. At this time, the subsidiary light source 7 is turned off, and the irradiation of light onto the reference surface (R) is cut off using the mechanical shutter 8.

Thereafter, coaxial/falling illumination is irradiated onto the surface (P) of the target object 3 by turning on the main light source 11 and the subsidiary light source 7 simultaneously, a second image is obtained by capturing the image of the surface (P) of the target object 3 using the light detecting element 5, and then whether or not the surface (P) of the target object 3 is defective is detected by analyzing the captured second image. At this time, the irradiation of light onto the reference surface (R) is cut off using the mechanical shutter 8.

Here, in case that any one of the illumination units 1 of FIGS. 2 to 4 is used, since the light emitting diodes arranged in a matrix shape are divided into groups according to layers, it is preferable that the turning-on of the light emitting diodes in the respective groups is selectively controlled according to a desired area or brightness.

Inspection regions, for which three-dimensional inspection is performed, is abstracted using the above obtained two-dimensional data regarding the size and surface defect of the target object.

Figure 6:
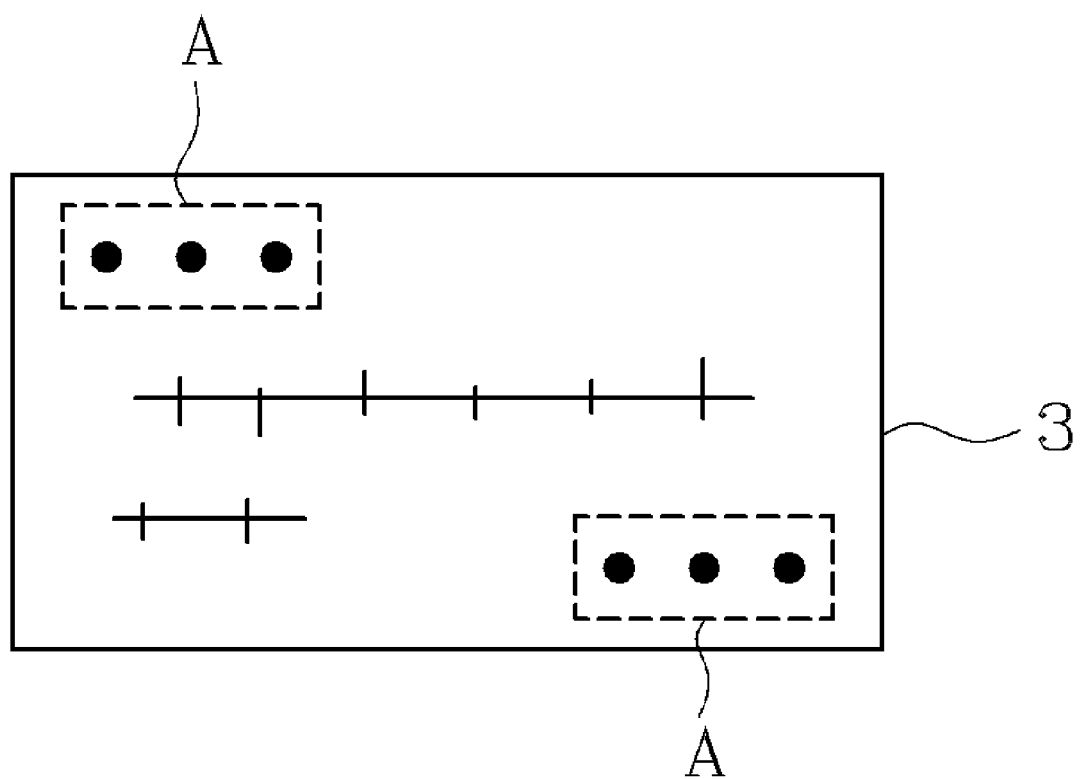
FIG. 6 is an exemplary view illustrating an embodiment of a surface shape measuring method in accordance with the present invention and FIG. 7 is a schematic view of a conventional surface shape measuring system using white-light scanning interferometry.
Figure 7:
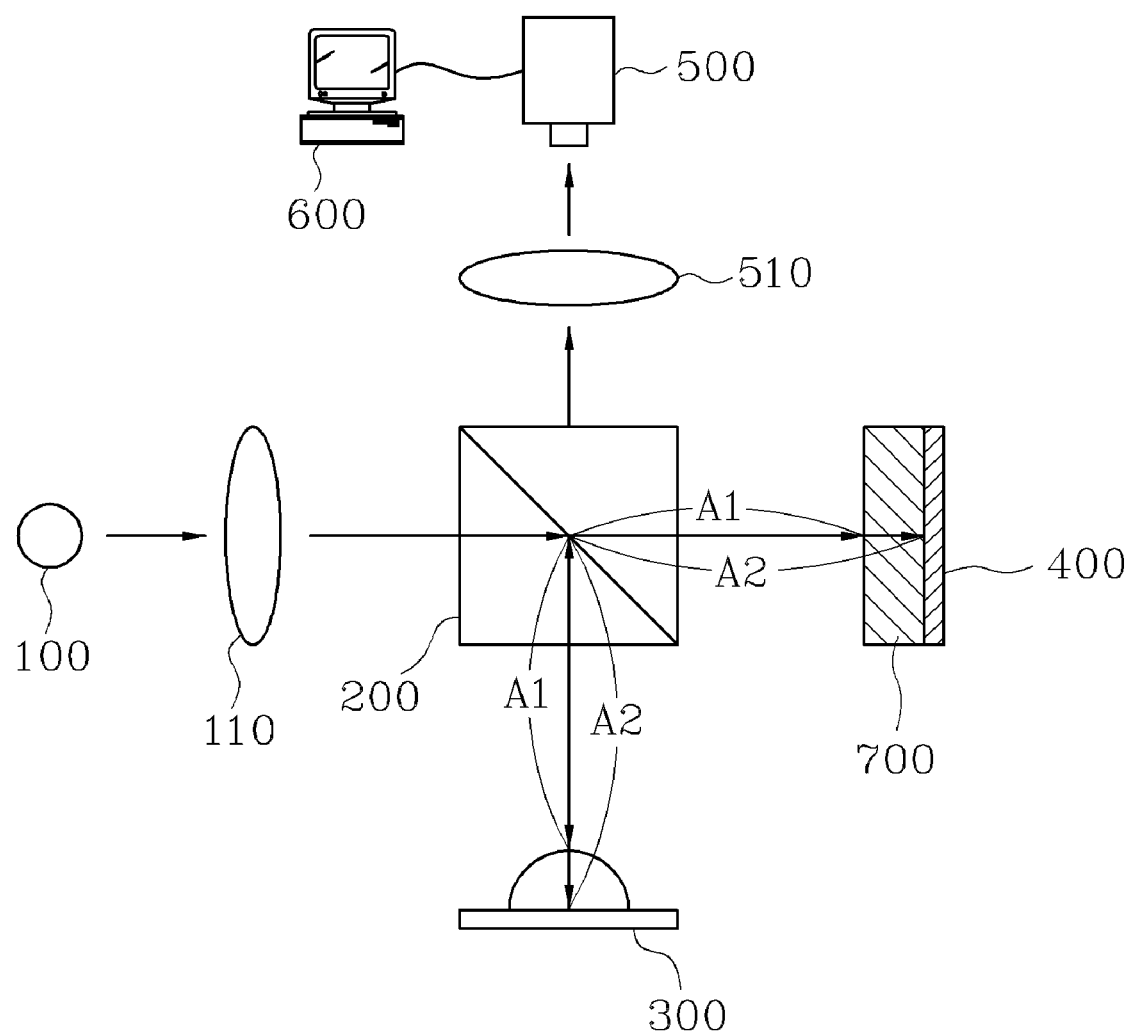

For example, as shown in FIG. 6, two-dimensional data for the overall surface of the target object are obtained, and regions requiring three-dimensional inspection, such as regions "A", are abstracted, and an interference pattern of a reference beam and an object beam for the corresponding regions is generated and then three-dimensional shape inspection is performed. Thereby, an inspection speed is increased.

Now, the three-dimensional shape inspection using white-light scanning interferometry, which analyzes an interference pattern generated by the interference of the reference beam and the object beam respectively reflected by the reference surface (R) and the measurement surface (P), will be described in brief.

First, the subsidiary light source 7 is turned off and only the main light source 11 is turned on, and the mechanical shutter 8 is opened such that light emitted from the main light source 11 is respectively irradiated onto the reference surface (R) and the measurement surface (P).

Then, the light is reflected by the reference surface (R) and the measurement surface (P), and thus produces a reference beam and an object beam. An interference pattern formed by the interference of the reference beam and the object beam is captured by the light detecting element 5.

Since the interference pattern formed by the interference of the reference beam and the object beam is obtained when the interference beam and the object beam have the same optical path, it is preferable that the height of the target object 3 or the distance of the reference minor is properly adjusted using a fine driving unit (not shown), such as a PZT actuator.

In case that the main light source 11 includes a plurality of the light emitting diodes 111 arranged in a matrix shape, as shown in FIG. 2, only the central light emitting diode 111a having a brightness value, which is higher than that of other peripheral light emitting diodes 111, is preferably turned on in three-dimensional inspection so as to increase an interference pattern generating capacity.

INDUSTRIAL APPLICABILITY

As described above, the surface shape measuring system of the present invention includes the main light source and the subsidiary light source respectively providing coaxial illumination and falling illumination to a target object to be measured, obtains two-dimensional data by selectively intermitting the turning-on of the respective light sources and cutting off the irradiation of light onto the reference surface, abstracts three-dimensional inspection regions of the target object from the obtained two-dimensional data, and performs three-dimensional inspection only for the abstracted inspection regions. Thus, the surface shape measuring system of the present invention obtains both the two-dimensional data and the three-dimensional data of the target object using a single apparatus, thereby being capable of simplifying the apparatus.

Further, the surface shape measuring system of the present invention obtains the two-dimensional data of the target object in advance, abstracts the three-dimensional inspection regions of the target object from the obtained two-dimensional data, and obtains three-dimensional data only for the corresponding regions, thereby being capable of improving an inspection speed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:
1. A surface shape measuring system, comprising:
an illumination unit including a main light source, a focusing lens, and a projection lens;
a beam splitter to split illumination light emitted from the illumination unit into beams respectively irradiated onto a reference surface of a reference mirror and a measurement surface of a target object to be measured;

a light detecting element to capture an interference pattern generated by the interference of a reference beam and an object beam respectively reflected by the reference surface and the measurement surface; and a control computer to obtain surface shape data through white-light interference pattern analysis from an image captured by the light detecting element and detect whether or not the measurement surface is defective from the obtained data, wherein a subsidiary light source to provide falling illumination to the target object is provided between the target object and the beam splitter; and two-dimensional data and three-dimensional data regarding the surface shape of the target object are obtained by selectively intermitting the turning-on of the main light source and the subsidiary light source and the irradiation of the illumination light onto the reference surface, wherein a mechanical shutter to selectively intermit the irradiation of the illumination light onto the reference surface is provided between the beam splitter and the reference mirror, wherein the subsidiary light source includes:
a ring-shaped body and
a plurality of light emitting diodes provided along the inner circumferential surface of the ring-shaped body, wherein the main light source includes:
an illumination panel and
a plurality of light emitting diodes arranged in a matrix shape on the illumination panel.

2. The surface shape measuring system according to claim 1, wherein the plurality of light emitting diodes is divided into groups according to layers in the outward direction from a central light emitting diode such that the turning-on of the plurality of light emitting diodes is controlled according to the groups.

3. The surface shape measuring system according to claim 2, wherein the central light emitting diode among the plurality of light emitting diodes has a brightness value being higher than that of other peripheral light emitting diodes.

4. The surface shape measuring system according to claim 1, wherein the illumination unit further includes:
an illumination panel formed between the focusing lens and the projection lens, and provided with a pin hole formed through the center of the illumination panel; and
a plurality of light emitting diodes arranged in a matrix shape on the illumination panel.

5. The surface shape measuring system according to claim 4, wherein the plurality of light emitting diodes is divided into groups according to layers in the outward direction from a central light emitting diode such that the turning-on of the plurality of light emitting diodes is controlled according to the groups.

6. The surface shape measuring system according to claim 4, wherein the focusing lens is a microscope objective lens.

7. The surface shape measuring system according to claim 1, wherein the two-dimensional data regarding the surface of the target object are obtained from size data through a first image captured using coaxial illumination obtained by turning on the main light source and surface defect data through a second image captured using coaxial/falling illumination obtained by turning on the main light source and the subsidiary light source.

8. The surface shape measuring system according to claim 7, wherein:
three-dimensional inspection regions of the target object are abstracted using the two-dimensional data; and
three-dimensional measurement is performed only for the abstracted three-dimensional inspection regions.

9. A surface shape measuring method, in which illumination light emitted from a main light source is split into beams, respectively irradiated onto a reference surface of a reference mirror and a measurement surface of a target object to be measured, by a beam splitter, and the surface shape of the target object is measured through an interference pattern generated by the interference of a reference beam and an object beam respectively reflected by the reference surface and the measurement surface, comprising:
obtaining two-dimensional data of the target object by cutting off the supply of the illumination light onto the reference surface and selectively intermitting the turning-on of the main light source and a subsidiary light source provided between the beam splitter and the target object;
abstracting three-dimensional inspection regions from the obtained two-dimensional data; and
obtaining three-dimensional data of the target object by generating an interference pattern for each of the abstracted inspection regions and capturing the interference pattern,
wherein the obtaining of the two-dimensional data includes:
obtaining size data of the target object using coaxial illumination obtained by turning on the main light source; and
obtaining surface defect data using coaxial/falling illumination obtained by turning on the main light source and the subsidiary light source.

10. The surface shape measuring method according to claim 9, wherein in the obtaining of the two-dimensional data, the cutting off of the supply of the illumination light onto the reference surface is selectively carried out through the intermission of a mechanical shutter.

* * * * *